(12) United States Patent
Rossi et al.

(10) Patent No.: US 11,018,620 B2
(45) Date of Patent: May 25, 2021

(54) SOLAR MODULE SKIRT ASSEMBLY

(71) Applicant: SUNPOWER CORPORATION, San Jose, CA (US)

(72) Inventors: Gary Rossi, San Jose, CA (US); Ethan Ely, San Jose, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

(21) Appl. No.: 16/580,125

(22) Filed: Sep. 24, 2019

(65) Prior Publication Data
US 2020/0099332 A1  Mar. 26, 2020

Related U.S. Application Data

(60) Provisional application No. 62/735,511, filed on Sep. 24, 2018.

(51) Int. Cl.
*H02S 30/10* (2014.01)
*H02S 20/23* (2014.01)

(52) U.S. Cl.
CPC .............. *H02S 30/10* (2014.12); *H02S 20/23* (2014.12)

(58) Field of Classification Search
CPC ................................ H02S 30/10; H02S 20/23
See application file for complete search history.

(56) References Cited

U.S. PATENT DOCUMENTS

| 9,431,953 | B2 * | 8/2016 | Stearns | F16M 13/02 |
|---|---|---|---|---|
| 9,825,581 | B2 * | 11/2017 | Wildes | F24S 25/632 |
| 10,020,773 | B2 * | 7/2018 | Molina | F24S 25/33 |
| 2014/0158184 | A1 * | 6/2014 | West | H02S 20/00 |
| | | | | 136/251 |
| 2015/0129517 | A1 * | 5/2015 | Wildes | H02S 20/23 |
| | | | | 211/41.1 |
| 2015/0249423 | A1 * | 9/2015 | Braunstein | F24S 25/636 |
| | | | | 52/173.3 |
| 2015/0288320 | A1 * | 10/2015 | Stearns | F24S 25/60 |
| | | | | 52/173.3 |
| 2017/0366131 | A1 * | 12/2017 | Stearns | F24S 25/70 |

* cited by examiner

*Primary Examiner* — Anita M King
(74) *Attorney, Agent, or Firm* — Oblon, McClelland, Maier & Neustadt, L.L.P.

(57) ABSTRACT

A solar module skirt assembly includes a skirt that is attached to a frame of a solar module, and a clip to attach the skirt to the solar module. The clip includes a first portion to attach to a frame of the solar module and to the skirt, a second portion to hold a portion of the frame of the solar module and a portion of the skirt, and a fastener to affix the clip to the frame of the solar module and the portion of the skirt.

20 Claims, 16 Drawing Sheets

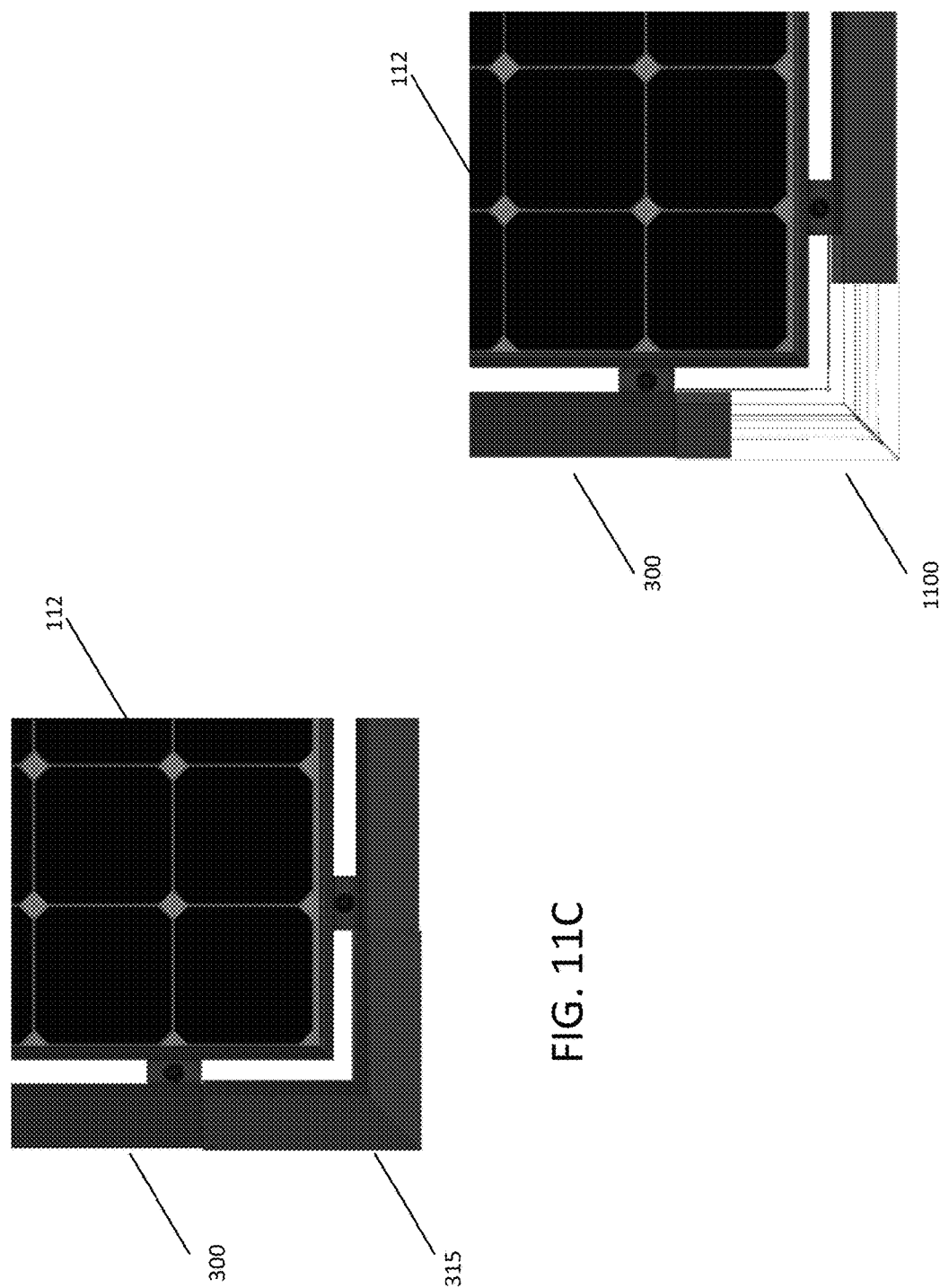

SOLAR MODULE SKIRT ASSEMBLY

CROSS-REFERENCE TO RELATED APPLICATIONS

This application claims the benefit of priority to provisional application No. 62/735,511, entitled "Solar Module Skirt Assembly," and filed Sep. 24, 2018. The entire contents of this provisional application are hereby incorporated by reference.

BACKGROUND

The present disclosure describes skirts for solar modules used in solar power systems.

Solar power systems have gained popularity and widespread use. However, many customers that have solar power systems installed object to the visibility of the underside of rooftop solar module installations because mechanical components and cabling may be visible from at least some angles.

SUMMARY OF THE INVENTION

The features described in this disclosure solve one or more of the above-identified problems with the conventional art.

In one exemplary aspect, a clip to attach a skirt to a solar module includes a clip body that attaches to a frame of the solar module and to the skirt, a base plate that holds a portion of the frame of the solar module and a portion of the skirt to the clip body, and a fastener that affixes the base plate to the clip body.

In another exemplary aspect, a solar module skirt assembly includes a skirt that is attached to a frame of a solar module, and a clip to attach the skirt to the solar module. The clip includes a clip body that attaches to the frame of the solar module and to the skirt, a base plate that holds a portion of the frame of the solar module and a portion of the skirt to the clip body, and a fastener that affixes the base plate to the clip body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11C is another top view of a skirt corner according to exemplary aspects of the disclosure;

FIG. 11D is a top view of mitered skirt segments to form a skirt corner according to exemplary aspects of the disclosure;

DETAILED DESCRIPTION

Figure 1:
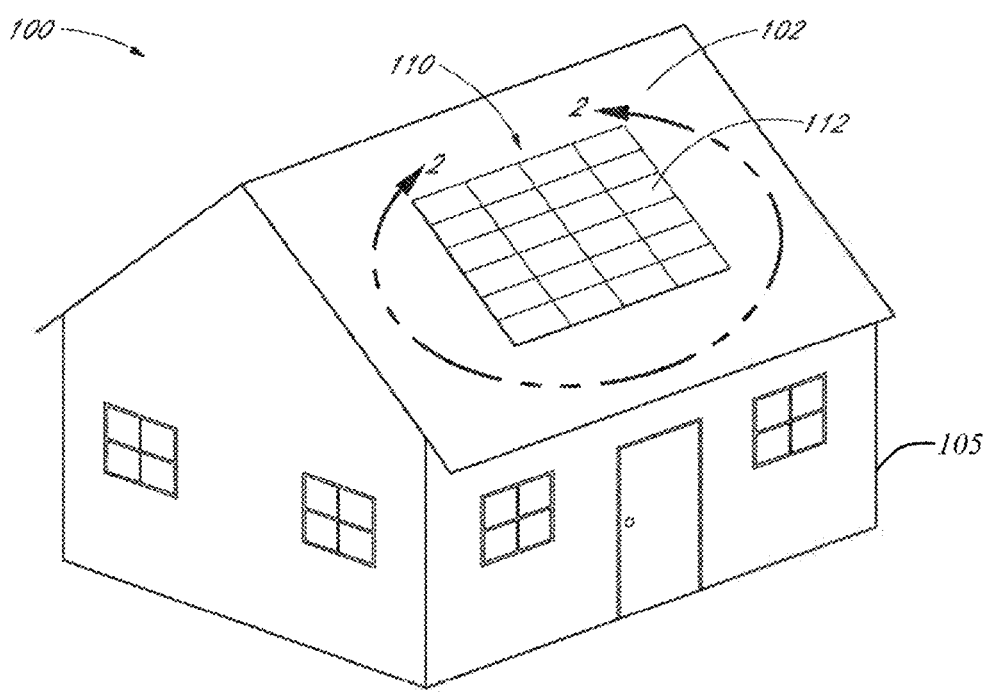
FIG. 1 is a schematic perspective view of a solar power system according to exemplary aspects of the present disclosure.

Referring now to the drawings, wherein like reference numerals designate identical or corresponding parts throughout the several views, FIG. 1 is a perspective view of a rooftop solar power system 100 according to exemplary aspects of the present disclosure. The solar power system 100 includes an array 110 of solar modules 112 mounted to a support structure 102. The solar modules convert light energy into electrical energy that can be stored for later use or that can be used immediately as one of ordinary skill would recognize. The specific type of solar module used is not limiting upon the present disclosure. For example, the solar modules 112 can include photovoltaic (PV) laminate or panels having an assembly of crystalline or amorphous semiconductor cells ("PV cells") that are electrically interconnected and encapsulated within a weatherproof barrier that can include a frame.

As illustrated in FIG. 1, the support structure can be a roof of a building 105, such as a house. However, the solar power system 100 may also be mounted to an office building, apartment building, warehouse, carport, or any other structure without limitation. FIG. 1 also illustrates the roof of the building 105 as being inclined, but the solar power system 100 may also be installed on a flat roof. The structure used to attach the solar power system 100 to the roof, or support structure 102, may also impart an angle of inclination to the solar power system in order to maximize sun exposure of the solar modules 112. As can be appreciated, the exact structure and method used to attach the solar power system 100 to the support structure 102 is not limiting upon the present disclosure.

Figure 2:
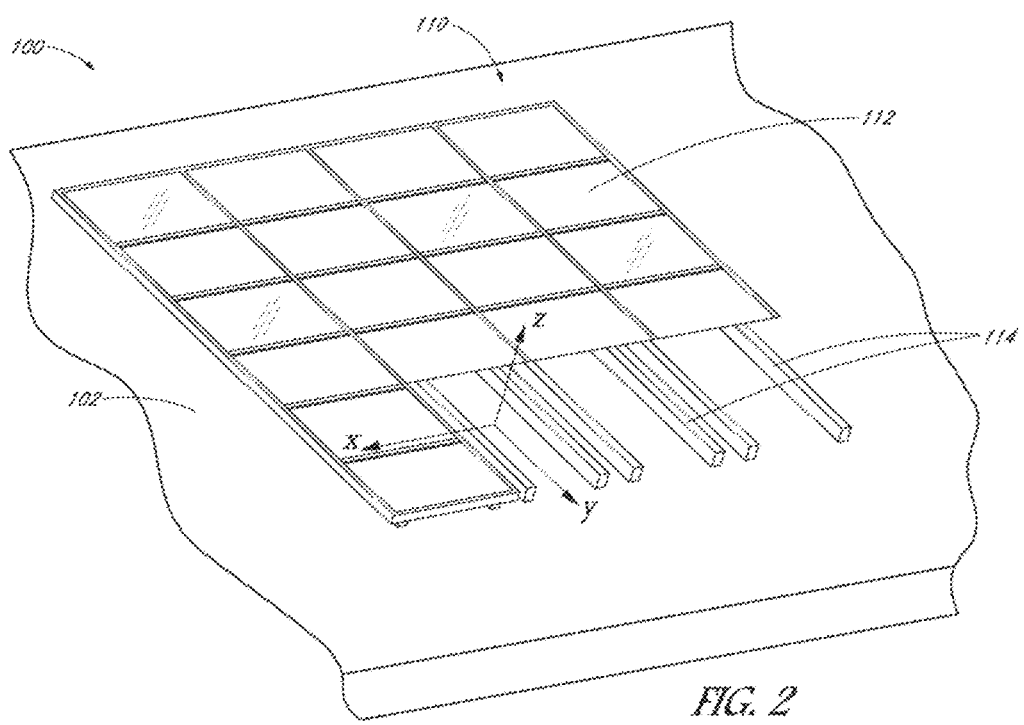
FIG. 2 is another schematic perspective view of a solar power system according to exemplary aspects of the present disclosure.

FIG. 2 is another schematic perspective of the solar power system 100 according to exemplary aspects of the disclosure. FIG. 2 illustrates that the array 110 is mounted to the support structure 102 via rails 114 that are spaced apart from each other. FIG. 2 also orients the solar power system 100, and the components thereof, to an xyz coordinate system. Thus, the rails 114 extend along the y direction in order to position the array 110 of solar modules 112 in the x-y plane.

The solar modules 112 may be attached to the rails 114 with anchors such as screws, bolts, clips, rivets, or a combination thereof. The rails 114 may also be attached to the support structure 102 with screws, bolts, clips, rivets, or a combination thereof. Thus, the method of securing the solar modules 112 to the rails 114, and the rails 114 to the support structure, is not limiting on the present disclosure. Moreover, the rails 114 may be constructed from materials such as aluminum, galvanized steel, stainless steel, fiberglass, carbon fiber, wood, or a combination thereof. Other materials are also possible as one of ordinary skill would recognize. In some exemplary embodiments, solar modules can be mounted to the support structure via a rail-less or rail-free implementation. For example, each solar module and/or one or more portions of the support structure can include integral mounting features or components (e.g. interlocking features, adhesives, etc.)

In order to block the rails 114 and/or any other mechanical or electrical components (e.g. fasteners, cables, power optimizers, water management gutters, etc.) from view, a skirt may be provided around the perimeter of the array 110. Such a skirt may be directly coupled to the solar modules 112 in order to provide the skirt about the entire perimeter of the array regardless of the shape of the array 110.

Figure 3:
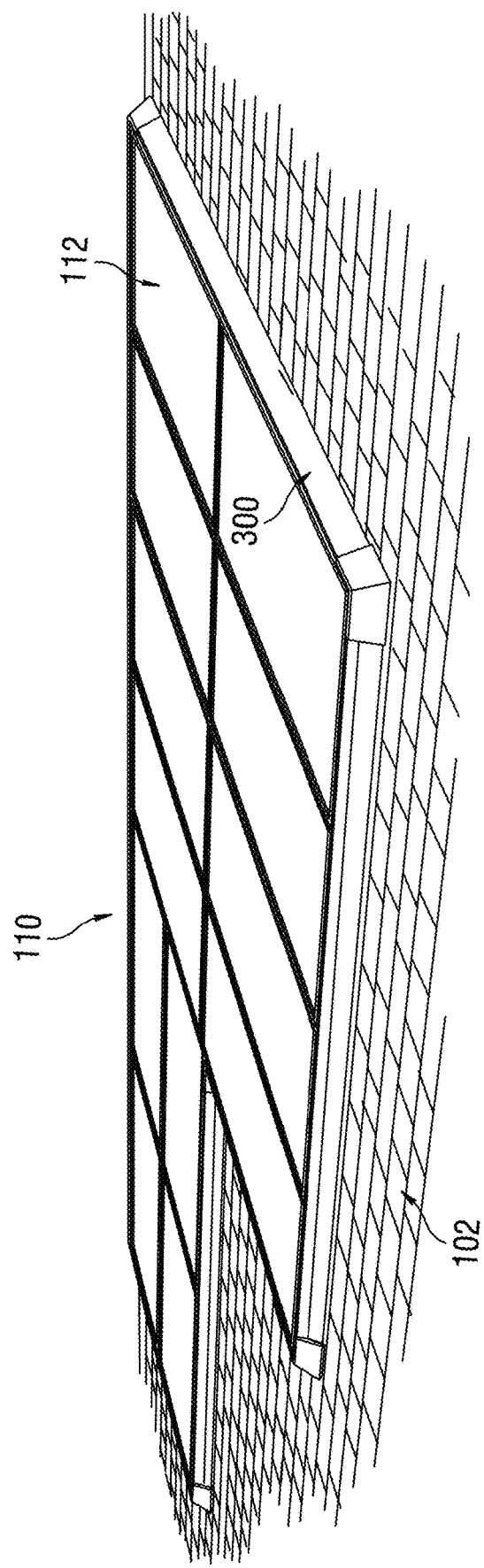
FIG. 3 is a further schematic perspective view of a solar power system with a skirt according to exemplary aspects of the disclosure.

FIG. 3 illustrates an array 110 of solar modules 112 with a skirt 300 according to exemplary aspects of the disclosure. As illustrated in FIG. 3, the array 110 is installed on a support surface, such as a shingled roof, and the skirt surrounds the array 110 to hide underlying components, such as the rails 114 illustrated in FIG. 2. As will be described in greater detail below, the skirt 300 may wrap completely around the perimeter array 110 in order to hide the underlying components from view regardless of viewing angle. However, the skirt 300 may also cover less than the entire perimeter of the array 110. For example, the upper portion of the perimeter of the array 110 may be left uncovered since viewing any underlying structural components from this portion of the array may be impossible, or at least difficult, from the ground. Thus, the portion of the perimeter of the array 110 covered by the skirt 300 is not limiting upon this disclosure.

Figure 4:
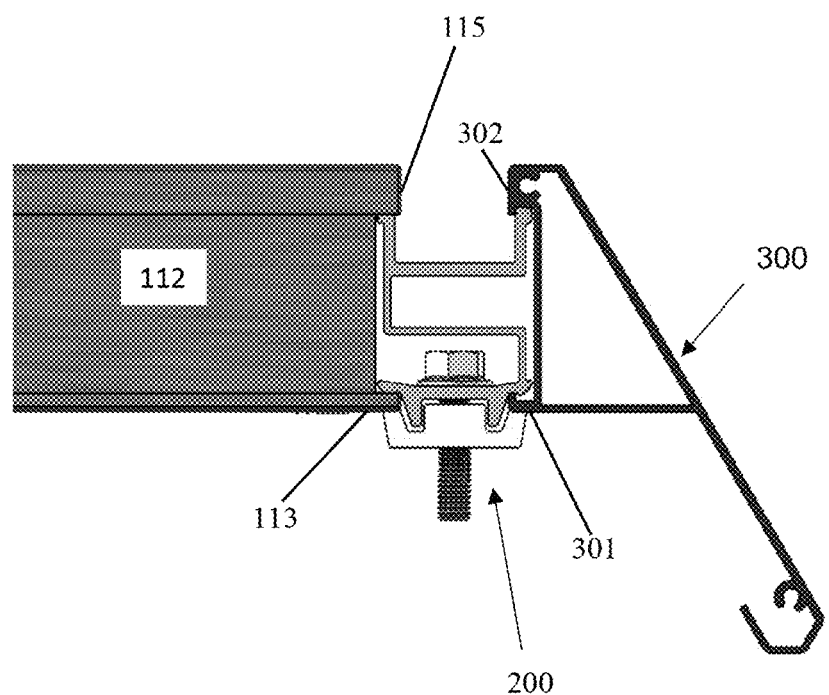
FIG. 4 is a side view of a solar module and skirt according to exemplary aspects of the present disclosure.

FIG. 4 is a cross-sectional view of a skirt 300 attached to a solar module 112 according to exemplary aspects of the present disclosure. As can be seen in FIG. 4, the solar module 112 has lip 113 at its lower edge and an overhang 115 at its upper edge. Though only a cross-section of the solar module 112 is illustrated, one of ordinary skill will appreciate that the lip 113 and the overhang 115 extend all along the perimeter of the solar module 112. The solar module includes a frame having lip and overhang features as depicted in FIG. 4, however, any other desirable edge features of a solar module can be implemented with corresponding features of a skirt clip body.

FIG. 4 also illustrates a cross-sectional view of the skirt 300, which also includes a lip 301 and an overhang 302. As can be seen from FIG. 4, the skirt 300 is structured to flair from the solar module 112 at a predetermined angle, such as 30 degrees relative to the side of the solar module 112, and extends below the bottom of the solar module in order to block any components and/or supporting structure from view once the solar module 112 is installed on the support structure 102. The skirt 300 may be made of aluminum, steel, stainless steel, galvanized steel, plastic, fiberglass, or any other rigid or semi-rigid material as one of ordinary skill will recognize. The skirt 300 is preferably also light weight in order to reduce the load on the support structure 102.

The skirt 300 is attached to the solar module 112 by a skirt clip 200 which fits between the lip 113 and the overhang 115 of the solar module 112, and fits between the lip 301 and the overhang 302 of the skirt 300. The skirt clip 200 is secured to both the solar module 112 and the skirt 300 by a fastener 230, such as a bolt, and a base plate 220 which is threaded to receive the fastener 230, as will be explained in further detail below. To this end, the overhang 115 of the solar module 112 and the overhang 302 of the skirt 300 each preferably define a pocket, or channel, in which an upper portion of the body 210 of the skirt clip 300 is trapped and prevented from disengaging from the overhangs 115 and 302. This allows the skirt clip 300 to be securely attached to both the solar module 112 and the skirt 300 with only one fastener, thereby reducing the complexity of the skirt clip 200 and its manufacturing cost.

Figure 5:
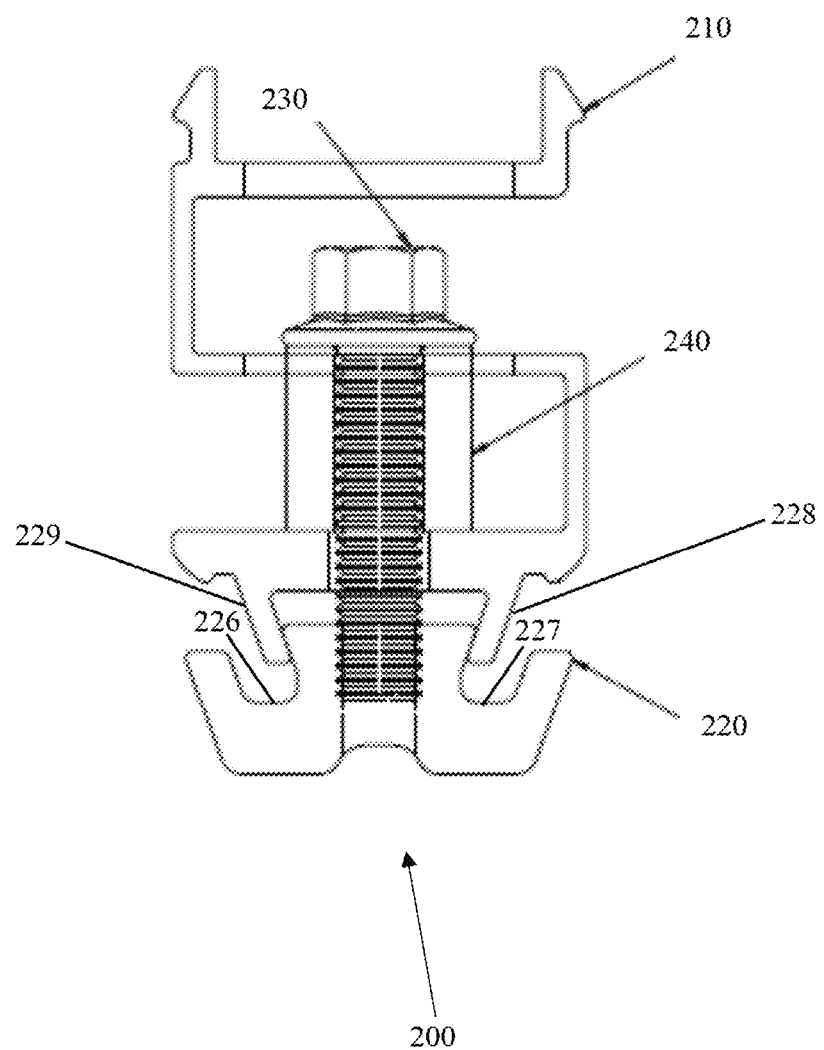
FIG. 5 is a cross-sectional view of a skirt clip according to exemplary aspects of the present disclosure.

FIG. 5 illustrates a skirt clip 200 according to exemplary aspects of the present disclosure. As discussed, above, the skirt clip 200 includes a body 210, a fastener 230 (e.g., a bolt), and a base plate 220. The skirt clip 200 also includes a spacer 240 that adds rigidity to the body 210 of the skirt clip 200 in the area of the fastener 230. This prevents the body 210 of the skirt clip 200 from deforming as the fastener is tightened.

The body 210 of the skirt clip 200 may be made from materials such as aluminum, steel, stainless steel, galvanized steel, or any other metal alloy that combines both strength and rigidity. The body 210 of the skirt clip 200 may also be made of other materials, such as a reinforced plastic, resin, or other polymer as one of ordinary skill would recognize. Also, though the cross-section of the body 210 of the skirt clip is illustrated as an "S" shape, other shapes are also possible with departing from the present disclosure. For example, the body 210 may be substantially solid having openings only to accommodate the fastener 230. If the body 210 is made to be solid, the spacer 240 may be omitted.

As noted above, the skirt clip 200 is affixed to the solar module 112 and the skirt 300 by the base plate 220. The opening 225 in the base plate 220 that receives the fastener 230 may be threaded in order to be secured to the body 210 of the skirt clip 200 by the fastener 230. Alternatively, the opening 225 in the base plate 220 may be unthreaded, and the fastener 230 may be made sufficiently long to exit from the bottom of the base plate 220 in order to have a nut, and possibly a washer, installed in order to secure the base plate 220 to the body 210 of the skirt clip 200.

The base plate 220 also includes grooves 226, 227 that correspond to the protrusions 228, 229 in the body 210 of the skirt clip 200. The grooves 226, 227 engage with the protrusions 228, 229 to prevent the base plate 220 from spinning as the fastener 230 is tightened, and also provides a more secure integration between the body 210 and the base plate. As illustrated in FIG. 5, the protrusions 228, 229 of the body 210 may be inclined towards each other to create a channel in which the base plate 220 is retained. However, the protrusions can also be made to incline away from each other, or to not incline, without departing from the scope of the present disclosure.

As can be appreciated, the base plate 220, the fastener 230, spacer 240, and the body 210 of the skirt clip 200 may be made from the same material (e.g., any of those materials listed above with respect to the base plate 210), or may be made from different materials. Preferably, the skirt clip 200 is pre-assembled prior to installation on the frame of the solar module 112 and the skirt 300. However, the skirt clip 200 may also be assembled during installation. Thus, the material make-up and assembly of the skirt clip 200 is not limiting on the scope of the present disclosure.

Figure 6:
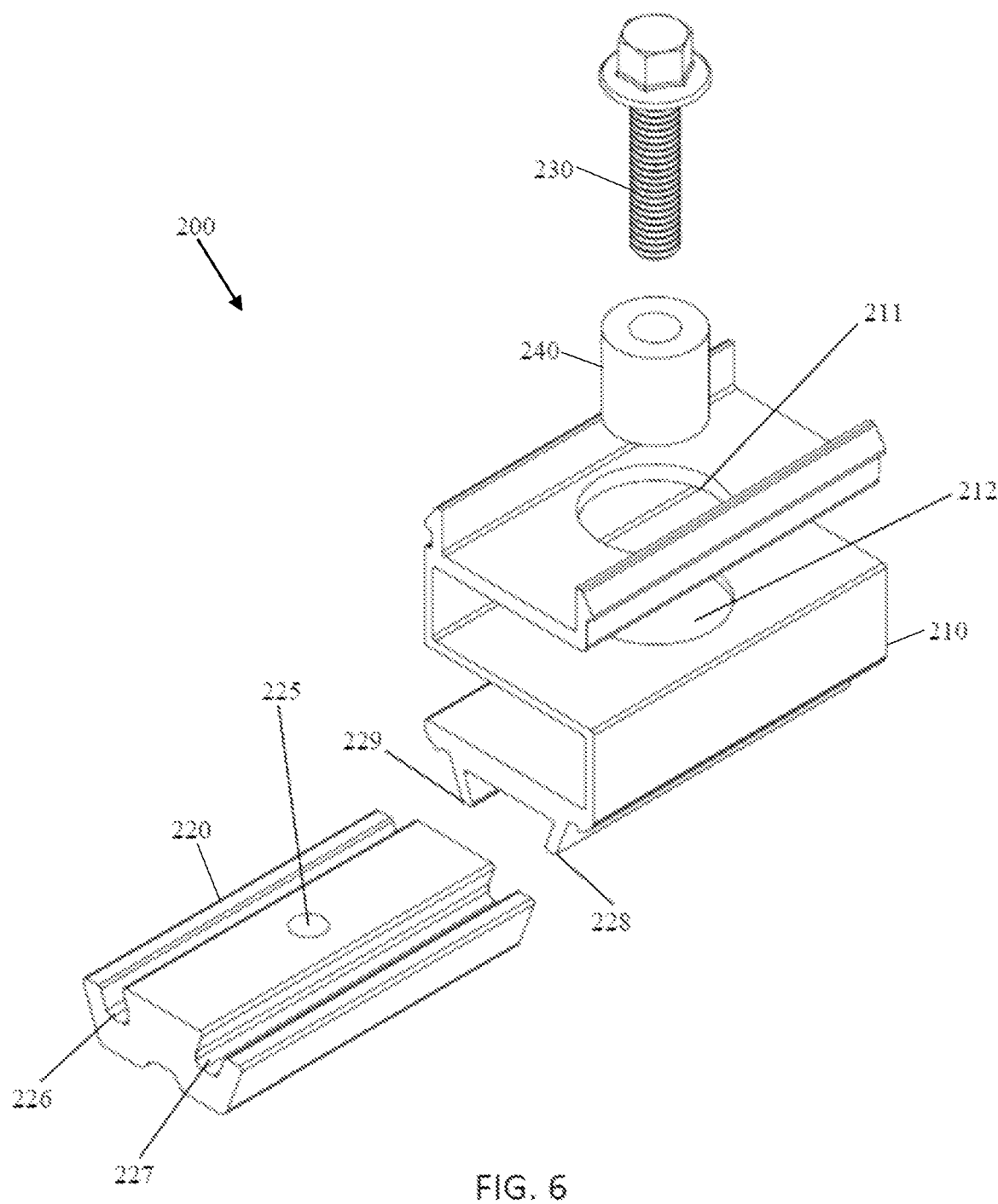
FIG. 6 is a schematic perspective view of a skirt clip according to exemplary aspects of the present disclosure.

Next, FIG. 6 illustrates a perspective view of a skirt clip 200 according to exemplary aspects of the present disclosure. As can be appreciated from FIG. 6, the body 210 of the skirt clip 200 is an extruded shape, such as a serpentine or an "S" shape, and the base plate 220 is also an extruded shape. FIG. 6 also illustrates that the body 210 includes two openings 211, 212 that allow the fastener 230 to be installed. As can be appreciated the openings 211, 212 are larger than the head of the fastener, and preferably large enough to accommodate both the head of the fastener 230 and a tool used to tighten the fastener 230. Because the body 210 and the base plate 220 are extruded, they can be formed from extruded stock that is cut to a predetermined dimension. This facilitates manufacturing of the body 210 and the base plate 220 since one piece of extruded stock may yield several pieces (e.g., multiple bodies or multiple base plates).

Figure 7A:
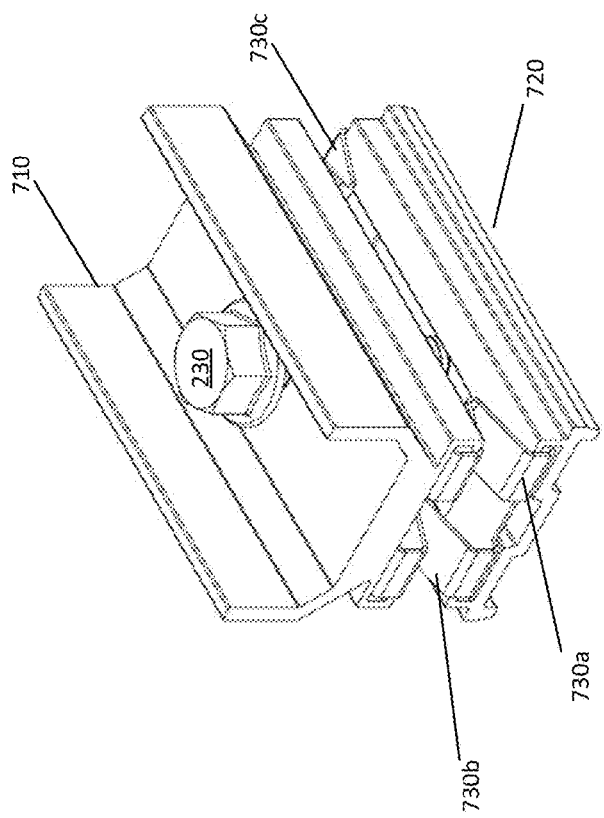
FIG. 7A is a schematic perspective view of another skirt clip according to exemplary aspects of the disclosure.

FIG. 7A illustrates another skirt clip 700 according to exemplary aspects of the disclosure. The skirt clip 700 includes an upper piece 710 that is held to a lower piece 720 by sheet metal springs 730a, 730b, 730c, and 730d (not shown). Thus, the skirt clip 700 has a two-piece body. When the bolt 230 is tightened (i.e., turned in order to cause a separating force between the upper piece 710 and the lower piece 720) the skirt clip is locked into the lip and overhang of a solar module, such as the solar module 112 of FIGS. 1-4. Tightening of the bolt 230 also causes the skirt clip 700 to be locked to into the lip and overhang of a skirt segment, such as the skirt segment illustrated in FIG. 4.

Figure 7C:
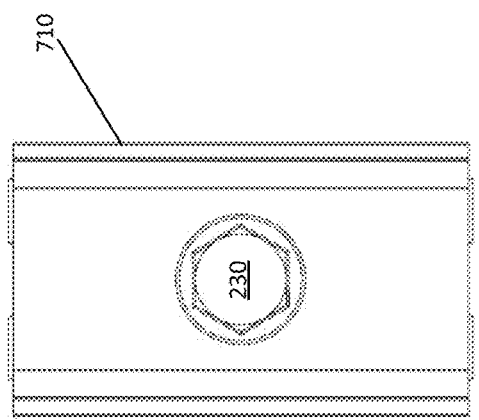
FIG. 7C is a top view of the other skirt clip according to exemplary aspects of the disclosure.
Figure 7D:
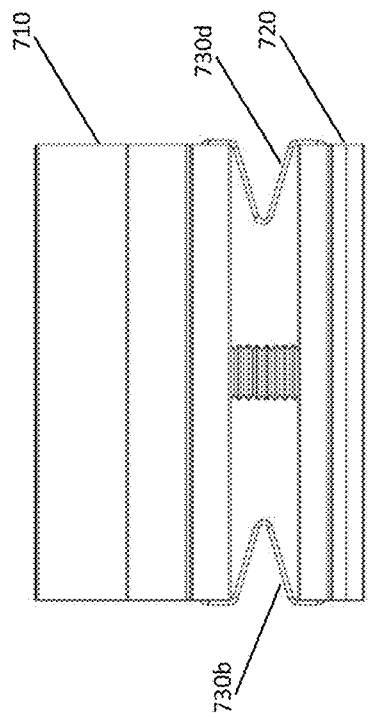
FIG. 7D is another side view of the other skirt clip according to exemplary aspects of the disclosure.
Figure 7B:
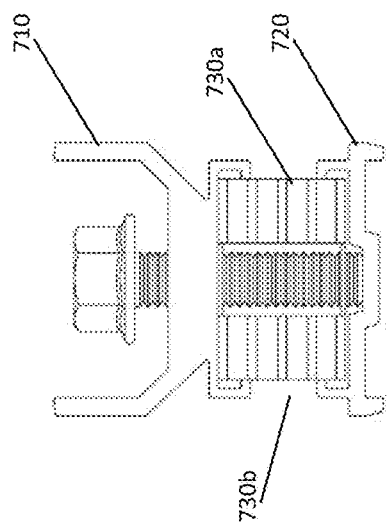
FIG. 7B is a side view of the other skirt clip according to exemplary aspects of the disclosure.

FIG. 7B illustrates a side view of the skirt clip 700 according to exemplary aspects of the disclosure. As illustrated in FIG. 7B, the upper piece 710 and the lower piece 720 of the skirt clip are formed to include a channel structure to which the springs 730a, 730b, 730c, and 730d are attached. Attachment of the springs 730a, 730b, 730c, 730b to the upper piece 710 and the lower piece 720 may be made using elastic force from the springs themselves or may be made by welding the springs 730a, 730b, 730c, 730b into the channels of the upper piece 710 and the lower piece 720. The springs 730a, 730b, 730c, 730b may also be attached to the upper piece 710 and the lower piece with an adhesive, such as an epoxy adhesive, or mechanically using a rivet, screw, or any other known fastening device. Thus, the specific method of attaching the springs 730a, 730b, 730c, 730b to the upper piece 710 and the lower piece 720 is not limiting upon this disclosure.

FIG. 7C is a top view of the skirt clip 700 and FIG. 7D is a side view of the skirt clip 700. Both of these figures illustrate that the skirt clip 700 is elongated along a direction of contact with a skirt segment and a solar module. However, the specific length of the skirt clip 700 is not limiting on this disclosure and other lengths are possible. For example, the skirt clip 700 may also have the same dimension along the sides that contacts the solar module/skirt segment and along the sides perpendicular to the solar module/skirt segment, thus forming a square in a top view, such as the top view of FIG. 7C. The corners of the upper piece 710 and the lower piece 720 may also be chamfered or rounded with respect to a top view to minimize binding and ease installation.

The skirt clip 700 may be made of aluminum, steel, stainless steel, or a rigid polymer as one of ordinary skill would recognize. This includes the upper piece 710, the lower piece 720, and the springs 730a, 730b, 730c, 730b. Of course, the upper piece 710, the lower piece 720, and the springs 730a, 730b, 730c, 730b may all be made of the same material, or may each be made from a different material in order to take advantage of each material's properties given the different functions of the upper piece 710, the lower piece 720, and the springs 730a, 730b, 730c, 730b.

Figure 8A:
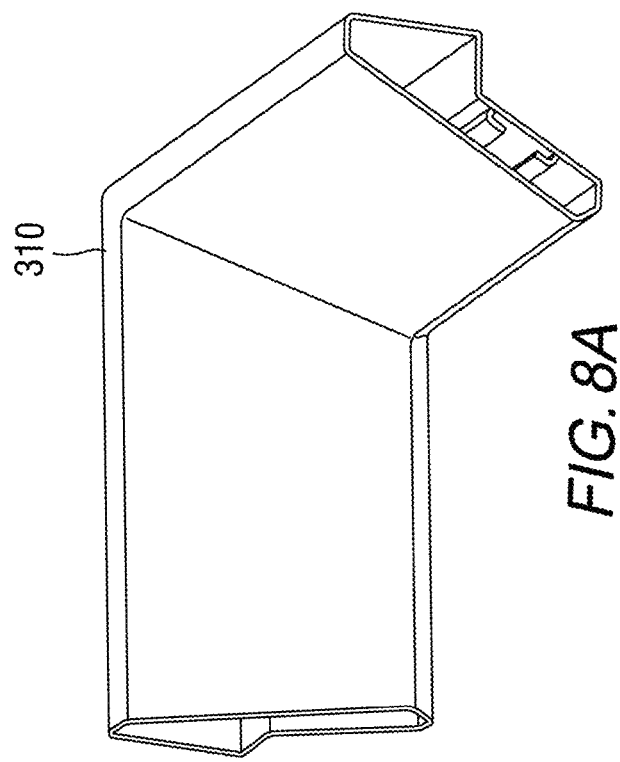
FIG. 8A is a schematic perspective view of an inside corner for a skirt according to exemplary aspects of the disclosure.
Figure 8B:
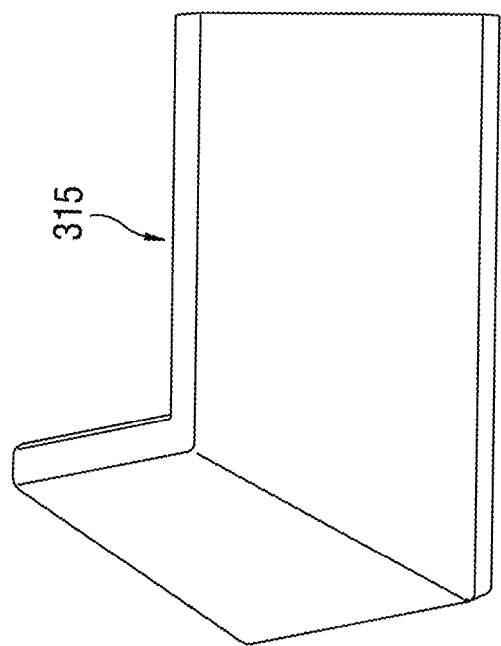
FIG. 8B is a schematic perspective view of an outside corner for a skirt according to exemplary aspects of the disclosure.

FIGS. 8A and 8B illustrate skirt corners according to exemplary aspects of the disclosure. As illustrated in FIG. 3, for example, in order to fully wrap an array of solar modules with a skirt, the skirt must change direction in accordance with the shape of the array. For example, the skirt must make a right-angle turn. To this end, skirt corner 310 (FIG. 8A) and skirt corner 315 (FIG. 8B) may be used to make the right-angle turn in the skirt. If the turn is an inside turn, the inside corner 310 of FIG. 8A may be used, and if the turn is an outside turn, the outside corner 315 of FIG. 8B can be used. As can be appreciated, the skirt corners 310 and 315 may be made of materials such as aluminum, steel, stainless steel, or a polymer or plastic. Thus, the material from which the skirt corners 310 and 315 are formed is not limiting upon this disclosure.

The skirt corners 310 and 315 may be formed such that a skirt segment is able to slide into the skirt corner 310 and 315. This can eliminate the need to use skirt clips to hold the skirt corners 310 and 315. Once a skirt segment is inserted into a skirt corner 310 or 315, the skirt segment may be held in place by friction, which allows for expansion of the skirt segments and the skirt corners 310 and 315 without causing the skirt to buckle or warp since the skirt segment is free to slide in and out of the skirt corner 310 or 315 in response to heating and/or cooling.

A skirt segment may also be held in a skirt corner 310 or 315 using a fastener such as a screw or a rivet. If a screw or rivet is used, the holes made in the skirt segment and the skirt corner 310 and 315 may be made larger than the screw or rivet, or may be elongated, in order to allow for movement due to thermal expansion and contraction.

Though FIGS. 8A and 8B illustrate skirt corners 310 and 315 which form right-angle corners, one of ordinary skill will recognize that skirt corners that make angles larger or smaller than a right angle are also possible. Skirt corners that make compound angles, such as one angle in an XY direction and another in an XZ or YZ direction, are also possible without departing from the scope of the present disclosure. Thus, the specific angle made by a skirt corner is not limiting.

Figure 9A:
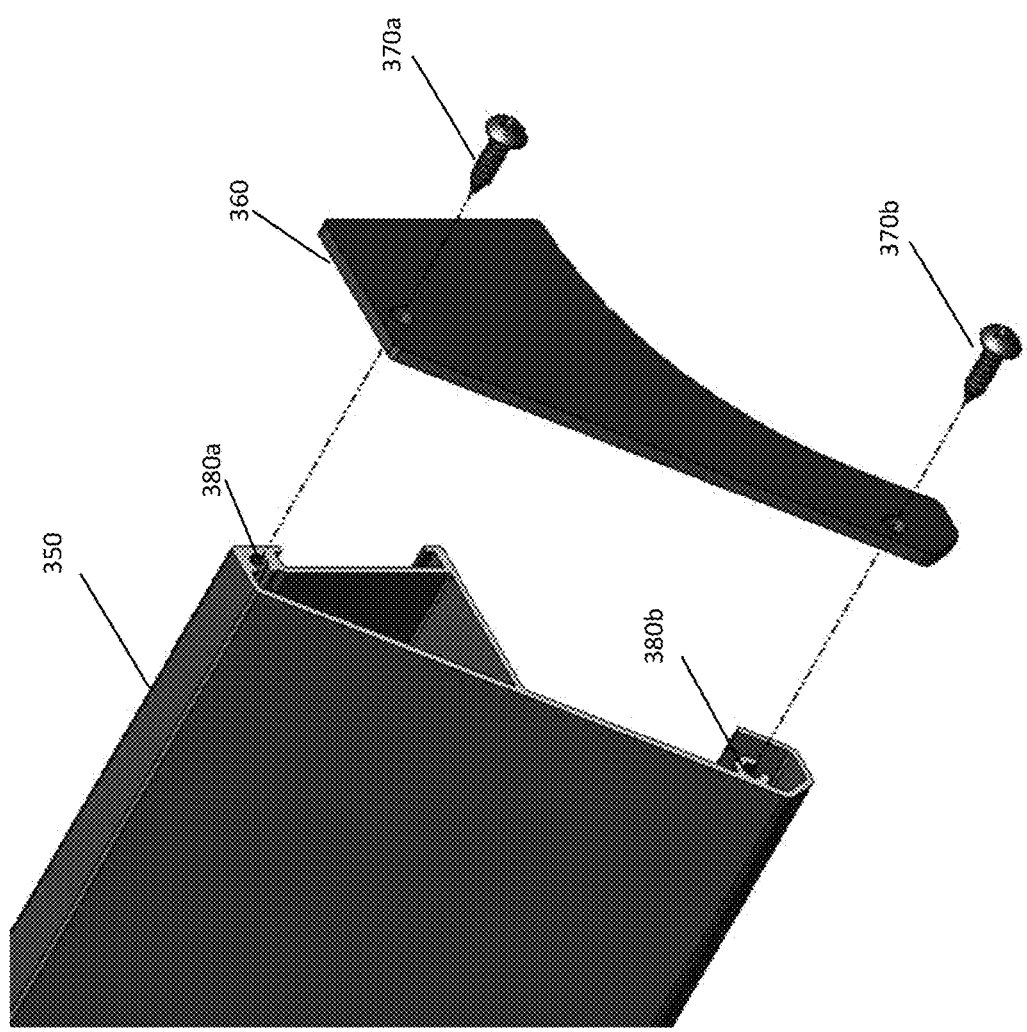
FIG. 9A is a schematic perspective view of installation of an end cap in a skirt segment according to exemplary aspects of the disclosure.
Figure 9B:
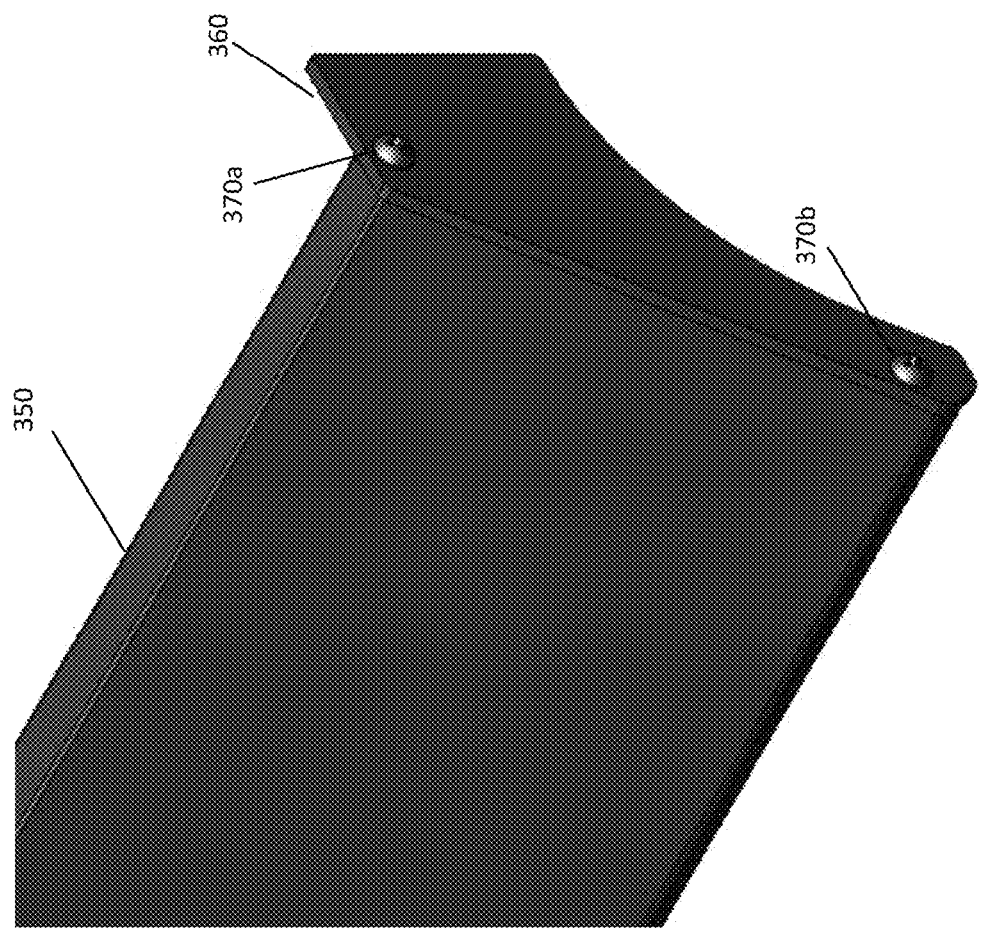
FIG. 9B is a schematic perspective view of a skirt segment with an end cap installed according to exemplary aspects of the present disclosure.

FIGS. 9A and 9B illustrate an end cap 360 that is attached to a skirt segment 350 in accordance with exemplary aspects of the disclosure. As illustrated in FIGS. 9A and 9B, an end cap 360 may be used to terminal a skirt segment 350. The end cap 360 may have a shape that is substantially similar to a cross-section of the skirt segment 350, and may be attached to the skirt segment 350 with screws 370a and 370b as illustrated in FIG. 9A. Also as illustrated in FIG. 9A, the skirt segment 350 may include threaded holes 380a and 380b to receive the screws 370a and 370b. As illustrated in FIG. 9B, the end cap 360 may also be large than the cross-section of the skirt segment 350 in order to cover both the open end of the skirt segment 350 and any underlying structural components hidden by the skirt segment 350.

As can be appreciated the end cap 360 may be made of substantially the same material and the skirt segment 350, or may be made of any other material described above with reference to the skirt segments and skirt corners. The end cap 360 may also be attached to the skirt segment 350 with rivets, spring clips, or may be welded or adhered to the skirt segment 350 using an adhesive. Other methods of attaching the end cap 360 to the skirt segment 350 are also possible as would be recognized by one of ordinary skill in the art.

Figure 10A:
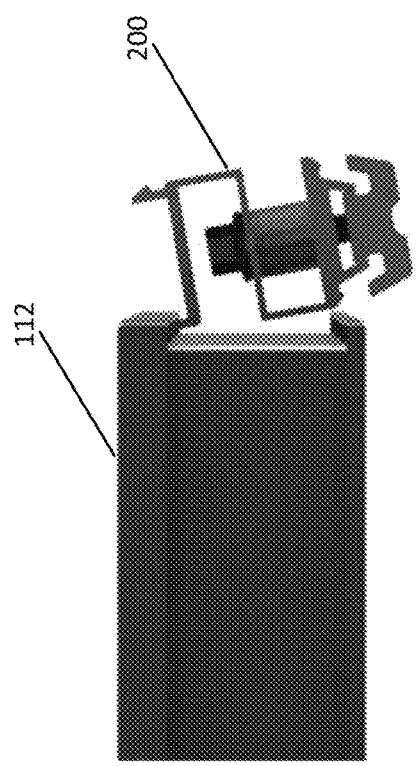
FIG. 10A is a side view of installation of a skirt clip according to exemplary aspects of the disclosure.
Figure 10B:
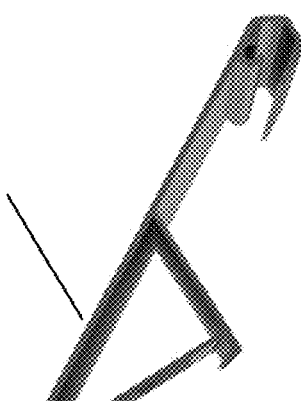
FIG. 10B is a side view of installation of a skirt segment onto a skirt clip according to exemplary aspects of the disclosure.
Figure 10D:
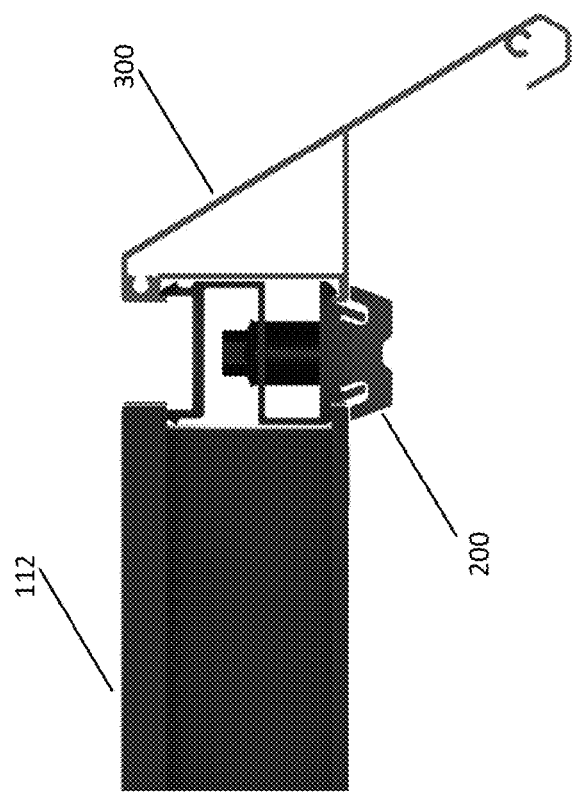
FIG. 10D is a side view of a skirt segment installed on a skirt clip after the skirt clip is tightened according to exemplary aspects of the disclosure.
Figure 10C:
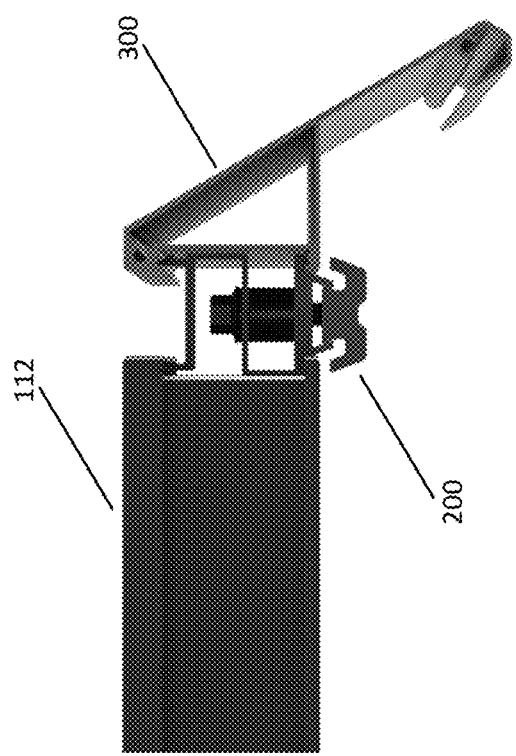
FIG. 10C is a side view of a skirt segment installed on a skirt clip according to exemplary aspects of the disclosure.

FIGS. 10A-10D illustrate attachment of a skirt 300 to a solar module 112 using a skirt clip according to exemplary aspects of this disclosure. In FIG. 10A, a skirt clip is attached to the overhang and lip of a solar module 112. At this stage the skirt clip 200 is not tightened, or at least not fully tightened. In FIG. 10B, a skirt 300, or a segment thereof, is attached to the skirt clip 200 such that the skirt 300 is held by skirt clip 200 via the overhang and lip of the skirt as illustrated in FIG. 10C. Once the skirt 300 is in place, the skirt clip 200 is tightened to hold the skirt 300 securely to the solar module 112 as illustrated in FIG. 10D. Though FIGS. 10A-10D illustrate using a skirt clip such as the skirt clip 200 of FIGS. 5-6, the skirt clip 700 of FIGS. 7A-7D may also be used in place of, or in addition to, the skirt clips 200.

Figures 11A, 11B:
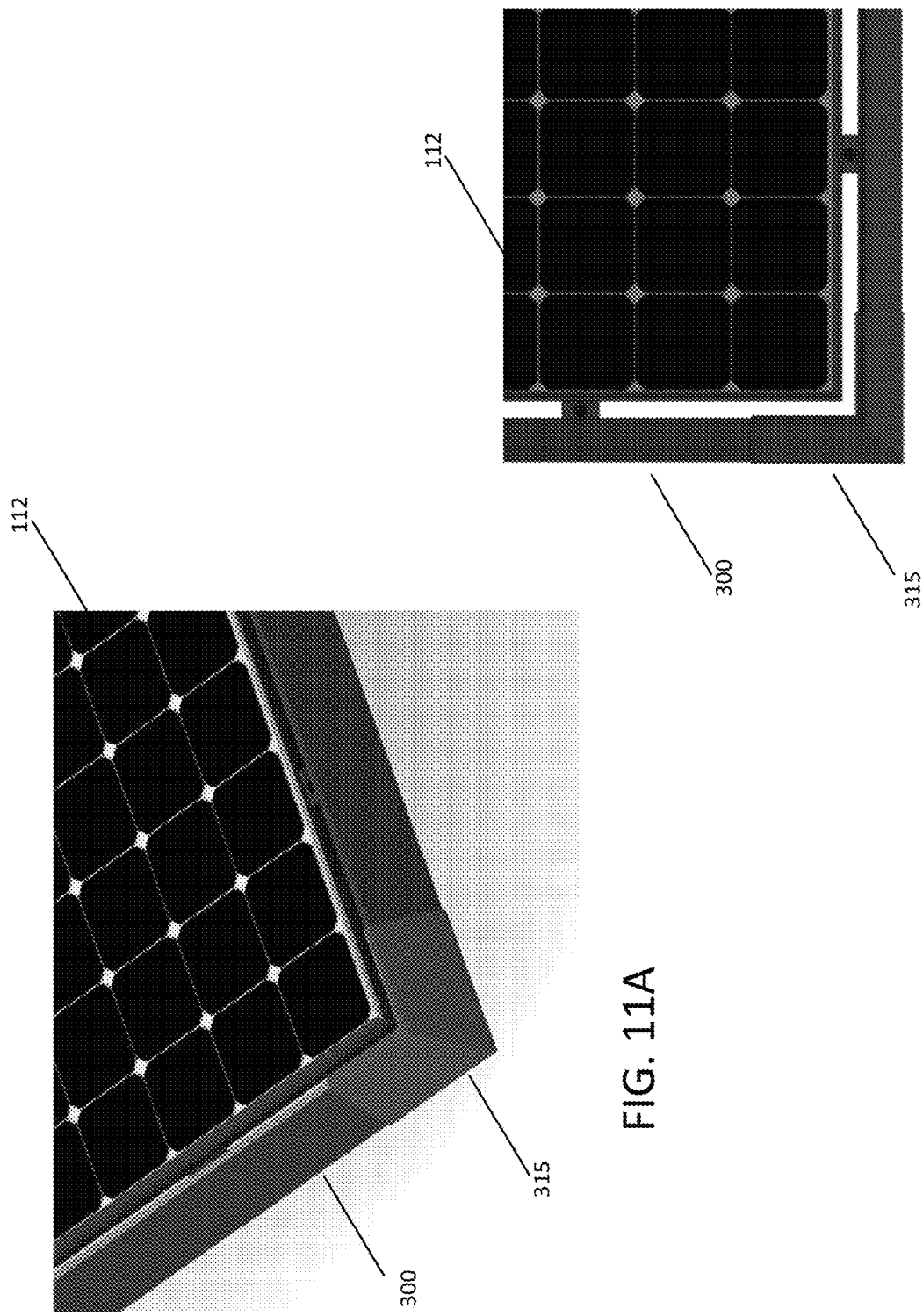
FIG. 11A is a schematic perspective view of an outside corner of a skirt according to exemplary aspects of the disclosure.
FIG. 11B is a top view of a skirt corner according to exemplary aspects of the disclosure.

FIGS. 11A-11D illustrate installation of a skirt 300 to a solar module 112, and more specifically, the positioning of skirt clips 200 and skirt corners 315 relative to the solar module 112. For example, FIG. 11A illustrates a skirt 300, including a skirt corner 315, after installation on a solar module 113. FIGS. 11B and 11C illustrate alternative positioning of skirt clips 200 to hold the skirt 300. In FIG. 11B the skirt clips 200 are further away from the skirt clip 315 than in FIG. 11C. However, the exact positioning of the skirt clips 200 relative to a skirt corner 315 depends on the specific application, and can vary without departing from the scope of the disclosure.

FIG. 11D illustrates a corner 1100 that is formed by mitering two skirt segments of the skirt 300. In this case, a separate skirt corner 315 is not used since the two skirt segments butt against each other to form the corner. The skirt segments may either be joined to each other in order to ensure that the corner does not open in response to thermal contraction as ambient temperature drops, or may rely solely on the skirt clips 200 to hold the corner 1100 together.

Figure 12B:
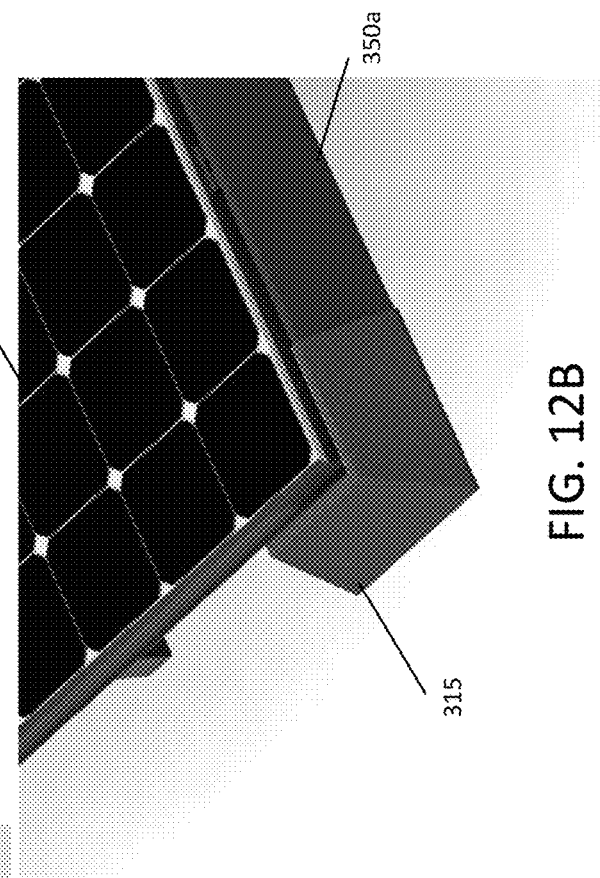
FIG. 12B is a schematic perspective view of a skirt corner installed on a skirt segment according to exemplary aspects of the disclosure.
Figure 12A:
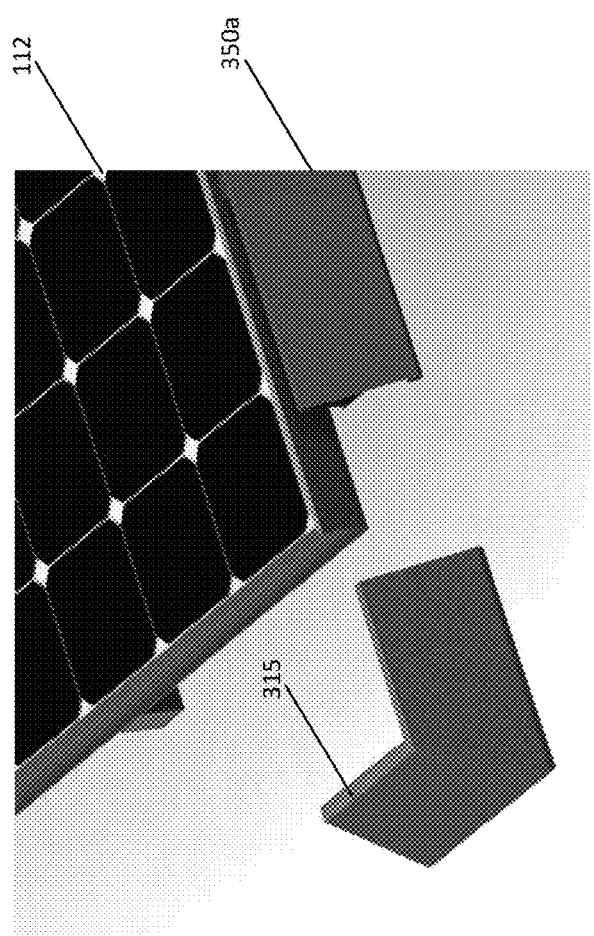
FIG. 12A is a schematic perspective view of installation of a skirt corner according to exemplary aspects of the disclosure.
Figure 12C:
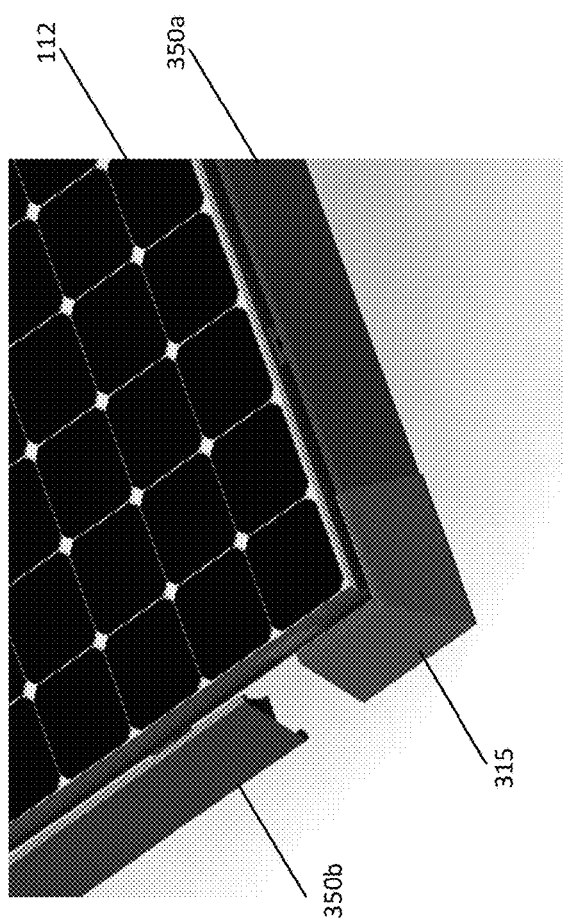
FIG. 12C is a schematic perspective view of installation of another skirt segment on the skirt corner according to exemplary aspects of the disclosure.

FIGS. 12A-12D illustrate the installation of a skirt corner 315 according to exemplary aspects of the disclosure. In FIG. 12A, a skirt segment 350a has already been attached to a solar module 112. In FIG. 12B, a skirt corner 315 is attached to the skirt segment 350a using any of the attachment methods described above. A second skirt segment 350b is then inserted into the skirt corner 315 in FIG. 12C, and the second skirt segment 350b is attached to the solar module 112 using skirt clips, such as skirt clip 200 or skirt clip 700.

Figure 12D:
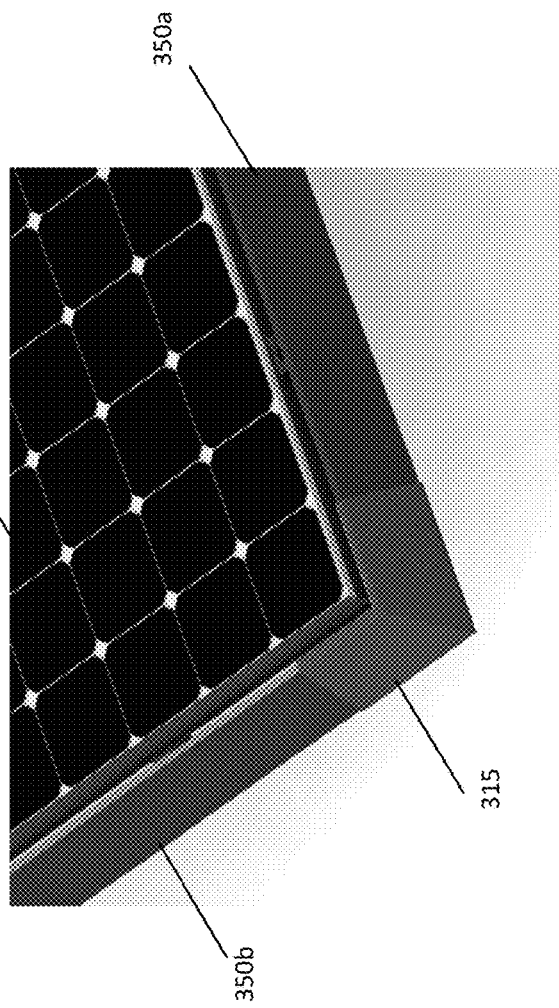
FIG. 12D is a schematic perspective view of a fully installed skirt corner according to exemplary aspects of the disclosure.

FIG. 12D illustrates the fully attached skirt segments 350a and 350b, and the skirt corner 315.

Obviously, numerous modifications and variations of the present invention are possible in light of the above teachings. It is therefore to be understood that within the scope of the appended claims, the invention may be practiced otherwise than as specifically described herein.

The invention claimed is:

1. A clip to attach a skirt to a solar module, comprising:
a first portion configured to attach to an edge feature of the solar module and to the skirt;
a second portion configured to hold a portion of the edge feature of the solar module and a portion of the skirt; and
a fastener configured to affix the clip to the edge feature of the solar module and the portion of the skirt;
wherein the edge feature of the solar module is a frame comprising an overhang and a lip; and,
wherein the first portion has a cross-section configured to fit between the overhang and the lip of the frame of the solar module and to fit between an overhang and a lip of the skirt.

2. The clip according to claim 1, wherein the first portion is a clip body and the second portion is a base plate configured to hold the lip of the frame and the lip of the skirt to the clip body in response to tightening of the fastener.

3. The clip according to claim 2, wherein the cross-section of the clip body is S-shaped.

4. The clip according to claim 2, wherein the base plate includes a threaded opening to receive the fastener and to allow the fastener to draw the base plate towards the clip body as the fastener is tightened.

5. The clip according to claim 4, wherein the clip body includes protrusions and the base plate includes channels corresponding to the protrusions, the protrusions and channels preventing the base plate from spinning as the fastener is tightened.

6. The clip according to claim 2, further comprising a spacer configured to prevent the clip body from deforming as the fastener is tightened.

7. The clip according to claim 1, wherein the first portion and the second portion are formed from extruded stock.

8. The clip according to claim 2, wherein the base body includes at least one opening to allow installation of the fastener.

9. The clip according to claim 1, further comprising a spring assembly configured to hold the first portion and the second portion together.

10. The clip according to claim 9, wherein the clip is secured to the solar module and the skirt by a separating force exerted on the first and second portions by the fastener, the separating force causing the first portion to move away from the second portion.

11. A solar module skirt assembly, comprising:
a skirt configured to be attached to a frame of a solar module, the frame comprising an overhang and a lip; and
a clip including:
a first portion configured to attach to the frame of the solar module and to the skirt;
a second portion configured to hold a portion of the frame of the solar module and a portion of the skirt; and
a fastener configured to affix the clip to the frame of the solar module and the portion of the skirt wherein the first portion has a cross-section configured to fit between the overhang and the lip of the frame of the solar module and to fit between an overhang and a lip of the skirt.

12. The solar module skirt assembly according to claim 11, wherein the skirt includes a plurality of skirt segments, each skirt segment being configured to be attached to a different side of the frame of the solar module.

13. The solar module skirt assembly according to claim 12, wherein the solar module is included in a solar module array in which at least one side of the frame of the solar module is adjacent to another solar module, and skirt segments are attached to each side of the frame of the solar module except the side of the frame of the solar module adjacent to the other solar module.

14. The solar module skirt assembly according to claim 11, wherein the skirt is configured to extend below the solar module.

15. The solar module skirt assembly according to claim 12, further comprising at least one skirt corner to attach to two skirt segments to form a corner having a predetermined angle.

16. The solar module skirt assembly according to claim 15, wherein the predetermined angle is a right angle.

17. The solar module skirt assembly according to claim 15, wherein the skirt segments slide into the skirt corner.

18. The solar module skirt assembly according to claim 17, wherein the skirt segments are held in the skirt corner by friction.

19. The solar module skirt assembly according to claim 17, wherein the skirt segments are held in the skirt corner by a fastener including at least one of a screw and a rivet.

20. A solar assembly, comprising:
a solar module comprising an overhang and a lip at an edge of the solar module;
a skirt comprising an overhang and a lip;
a clip comprising a cross-section configured to fit between the overhang and the lip at the edge of the solar module and to fit between the overhang and the lip of the skirt; and
a fastener configured to affix the clip to the solar module and the skirt.

* * * * *